US008700000B2

(12) United States Patent
Pauliac

(10) Patent No.: US 8,700,000 B2
(45) Date of Patent: Apr. 15, 2014

(54) REUSE OF IDENTITY DATA FROM A USER EQUIPMENT IDENTITY MODULE BY A PERIPHERAL DEVICE

(75) Inventor: Mireille Pauliac, Aubagne (FR)

(73) Assignee: Gemalto SA, Meudon (FR)

( * ) Notice: Subject to any disclaimer, the term of this patent is extended or adjusted under 35 U.S.C. 154(b) by 863 days.

(21) Appl. No.: 11/630,960

(22) PCT Filed: May 19, 2005

(86) PCT No.: PCT/EP2005/052308
§ 371 (c)(1),
(2), (4) Date: Dec. 28, 2006

(87) PCT Pub. No.: WO2006/000502
PCT Pub. Date: Jan. 5, 2006

(65) Prior Publication Data
US 2008/0293377 A1    Nov. 27, 2008

(30) Foreign Application Priority Data
Jun. 28, 2004   (FR) ..................................... 04 07047

(51) Int. Cl.
*H04M 7/00*        (2006.01)
*H04M 1/38*        (2006.01)

(52) U.S. Cl.
USPC .......... 455/411; 455/41.2; 455/41.3; 455/557

(58) Field of Classification Search
USPC ................... 455/555, 557; 713/173
See application file for complete search history.

(56) References Cited

U.S. PATENT DOCUMENTS

| | | | |
|---|---|---|---|
| 5,553,314 A | | 9/1996 | Grube et al. |
| 6,928,299 B1* | | 8/2005 | Rinne et al. .................... 455/555 |
| 2002/0097262 A1* | | 7/2002 | Iwase et al. .................... 345/744 |
| 2004/0266404 A1* | | 12/2004 | Nasu et al. ................. 455/414.1 |
| 2005/0070278 A1* | | 3/2005 | Jiang .......................... 455/432.3 |
| 2005/0075106 A1* | | 4/2005 | Jiang .......................... 455/432.3 |

FOREIGN PATENT DOCUMENTS

| | | |
|---|---|---|
| EP | 1 075 155 A1 | 2/2001 |
| EP | 1075155 A1 | 2/2001 |

OTHER PUBLICATIONS

Bluetooth Specification version 1.1 Feb. 22, 2001, pp. 150 and 199.*
Wikipedia printout on Network Switching Subsystems (pp. 1, and 4-5).*

(Continued)

*Primary Examiner* — Rafael Pérez-Gutiérrez
*Assistant Examiner* — Joshua Schwartz
(74) *Attorney, Agent, or Firm* — Buchanan Ingersoll & Rooney PC

(57) ABSTRACT

The invention relates to the reuse of identity data from an identity module in a user equipment by a peripheral device. In order to enable the reuse of identity data from an identity module, such as a SIM or UICC card, in a user equipment by a peripheral device, the identifier of the peripheral device is transmitted to the module upon establishment of communication and authentication between the module and the peripheral device. Subsequently, identity data are transmitted, preferably selectively, by the identity module to the peripheral device when the transmitted identifier is recognized as one of the identifiers of the peripheral devices that were previously stored in the identity module. The identity data are reused by the peripheral device in order to establish a communication with the home network of the user equipment or with a local wireless network.

19 Claims, 2 Drawing Sheets

(56) References Cited

OTHER PUBLICATIONS

Feasibility Study on SIM Security Reuse by Peripheral Devices on Local Interfaces, 3rd Generation Partnership Project, Technical Specification Group Services and System Aspects, 3GPP TR 33.817 V6.0.0, Mar. 2004, pp. 1-29.
International Search Report dated Oct. 28, 2005.

* cited by examiner

REUSE OF IDENTITY DATA FROM A USER EQUIPMENT IDENTITY MODULE BY A PERIPHERAL DEVICE

The present invention relates in a general way to the interoperability between services offered by means of a communication network for user equipment, for example a cellular radio-communication network for mobile user terminals, and the capability of accessing a wireless local area network from a peripheral device connected to user equipment.

More specifically, the invention relates to the reuse of identity data stored in a user equipment identity module, such as a removable SIM card, by a peripheral device, as recommended by the 3GPP TR 33.816 V6.0.0 Technical Report, "Feasibility study on (U)SIM Security Reuse by Peripheral Devices on Local Interfaces", March 2004.

The invention aims to provide a method which automatically and selectively authorises a peripheral device to reuse identity data in a user equipment identity module, with a high level of security, so that the peripheral device can request the establishment of a communication link as if the user equipment itself had requested the communication link. The reuse of identity data by the peripheral device is carried out without any intervention on the part of the user and under the supervision of the operator of the communication network to which the identity module is connected.

To this end, a method of reusing identity data from a user equipment identity module by a peripheral device, the user equipment being connected to a communication network, is characterised in that it comprises the following steps:

prior storage of peripheral device identifiers in the identity module, transmission of the peripheral device identifier to the identity module during the establishment of a communication link and authentication between the identity module and the peripheral device, comparison of the transmitted peripheral device identifier with the identifiers previously stored in the identity module, and transmission of the identity data by the identity module to the peripheral device once the transmitted identifier is recognised as one of the previously stored identifiers.

According to a more complete embodiment of the invention, sets of respective identity data identifiers of the identity module are previously stored in association respectively with the peripheral device identifiers in the identity module. The method of reusing the identity data then comprises the following steps:

after comparing peripheral device identifiers, transmitting a request including predetermined identity data identifiers from the peripheral device to the identity module following a response from the identity module signalling that the transmitted peripheral device identifier is on the list, comparing the predetermined identity data identifiers in the request with the identity data identifiers previously stored in the identity module, and when all the predetermined identity data identifiers are recognised as being previously stored identity data identifiers, transmitting the identity data designated by the transmitted data identifiers recognised among the identity data identifiers associated with the peripheral device identifier, from the identity module to the peripheral device.

Other characteristics and advantages of the present invention will become clearer from reading the following descriptions of several preferred embodiments of the invention, provided as non-limiting examples in reference to the corresponding appended drawings in which:

FIG. 1 shows several networks and entities that can be involved in a preferred implementation of the method of reusing identity data according to the invention.

The entities mainly include user equipment EU equipped with an identity module MI, one or more peripheral devices DP1 to DPJ, and an identifier management platform PF dedicated in particular to a service for reusing identity data.

According to the example shown in FIG. 1 referred to below, the user equipment EU is a mobile radio-communication terminal into which a removable user chip card connected to a cellular digital radio-communication network RR is inserted, the operator of said network having supplied the card as a removable identity module MI. The chip card is a SIM (Subscriber Identity Module) card when the network RR is a second generation network such as GSM or GSM/GPRS, or a UICC (Universal Integrated Circuit Card) card when the network RR is a third generation network such as UMTS. According to another example, the user equipment is a portable computer equipped with a removable chip card according to the ISO 7816 standard.

The cellular radio-communication network RR is represented schematically in the framework of a GSM network by the main means to which the user equipment EU is temporarily connected, such as a base transceiver station BTS, a base station controller BSC, a mobile switching centre MSC associated with a visitor location register VLR, and a home location register HLR. Within the framework of a UMTS network, the base station is a node (NodeB), and the base station controller is a Radio Network Controller (RNC).

Figure 1:
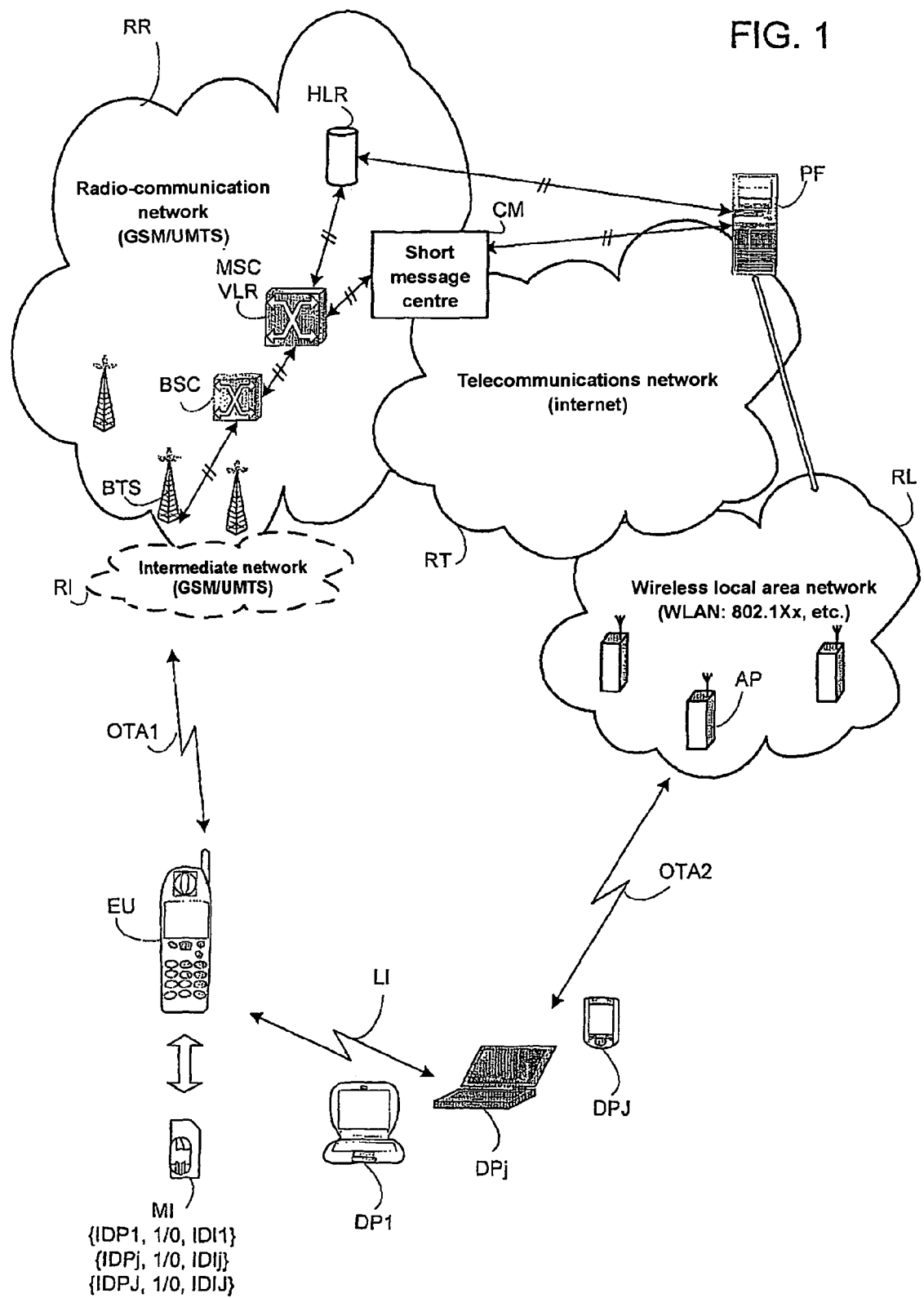
FIG. 1 is a block diagram of a telecommunications system for implementing the method of reusing identity data according to the invention.

It should be noted that at least one intermediate radio-communication network RI such as GSM or UMTS can be provided, as shown by the dotted lines in FIG. 1. The RI network temporarily serves the user equipment EU, for example when it is abroad, and connects in a known manner to the home radio-communication network RR.

Each peripheral device DPj, where $1 \leq j \leq J$, is a device designated by the user of the identity module MI which can be connected to the equipment EU by means of a link LI, simultaneously or not with a radio-communication link between the equipment EU and the radio-communication network RR. Each peripheral device DPj can be for example a portable computer, a personal digital assistant PDA, a different mobile terminal for a wireless local area network WLAN, or a mobile GSM or UMTS-type terminal.

The type of communication link LI between the user equipment EU and the peripheral device DPj depends on the interfaces available in the equipment EU and the device DPj. For example, the link LI is a Bluetooth link or one according to the 802.11b standard, or an infrared link or any other wireless link, or even a wired USB (Universal Serial Bus) link. In this context, the user equipment EU comprises not only a radio interface with the cellular network RR, but also a proximity link interface with at least one peripheral device DPj. As an alternative, the proximity link interface allows the user equipment EU to communicate simultaneously with several peripheral devices.

The management platform PF and the user equipment EU exchange requests and responses in the form of short messages through a Short Message Service Centre CM. The latter is directly or indirectly connected to the mobile switching centre MSC in the home network RR and serves the platform PF across a broadband telecommunications network RT such as the internet. The management platform PF is also directly or indirectly connected to the home location register HLR across the internet or a signalling network belonging to the network operator RR, as well as to the peripheral devices DP1 to DPJ across the internet RT and a wireless local area network RL such as a WLAN.

The short-range wireless local area network RL can conform to one of the 802.1Xx standards and can also satisfactorily fit the WiFi label. The short-range local area network RL in installed for example in a company, a hotel, or a public place such as a railway station or a shopping arcade. The local network RL comprises several radio access points AP forming radio bases which are capable of communicating with peripheral devices DP1 to DPJ located in a radius of several dozen meters. The access points AP are connected to each other by a distribution network, for example an intranet network, by means of an access server connected to the internet RT using xDSL lines, in order to provide broadband packet communication for the peripheral devices.

By means of the telecommunications system shown in FIG. 1, the invention contributes to providing communication between one DPj of the peripheral devices connected to the user equipment EU and the internet RT in order for this communication to be similar to communication between the user equipment EU and the internet RT, the user equipment EU then being transparent for the operator of the home radio-communication network RR.

Three types of communication can be initialized and used between the peripheral device DPj and the internet RT:
  communication through the user equipment EU via the link LI and through the fixed part of the network RR with which the identity module MI is associated, via the OTA1 (Over The Air) radio interface, or
  direct communication with the network RR without using the equipment EU, or
  communication via the OTA2 radio interface through the wireless local area network RL whose operator has signed an agreement with the operator of the network RR with which the identity module MI is associated, after having authorised such a communication by exchanging requests and responses between the peripheral device DPj, the identity module MI in the user equipment EU and the network RR via the link LI and the first OTA1 radio interface; simultaneously with this communication, the identity module MI can participate in standard communication via the user equipment EU, the OTA1 radio interface and the network RR.

Figure 2:
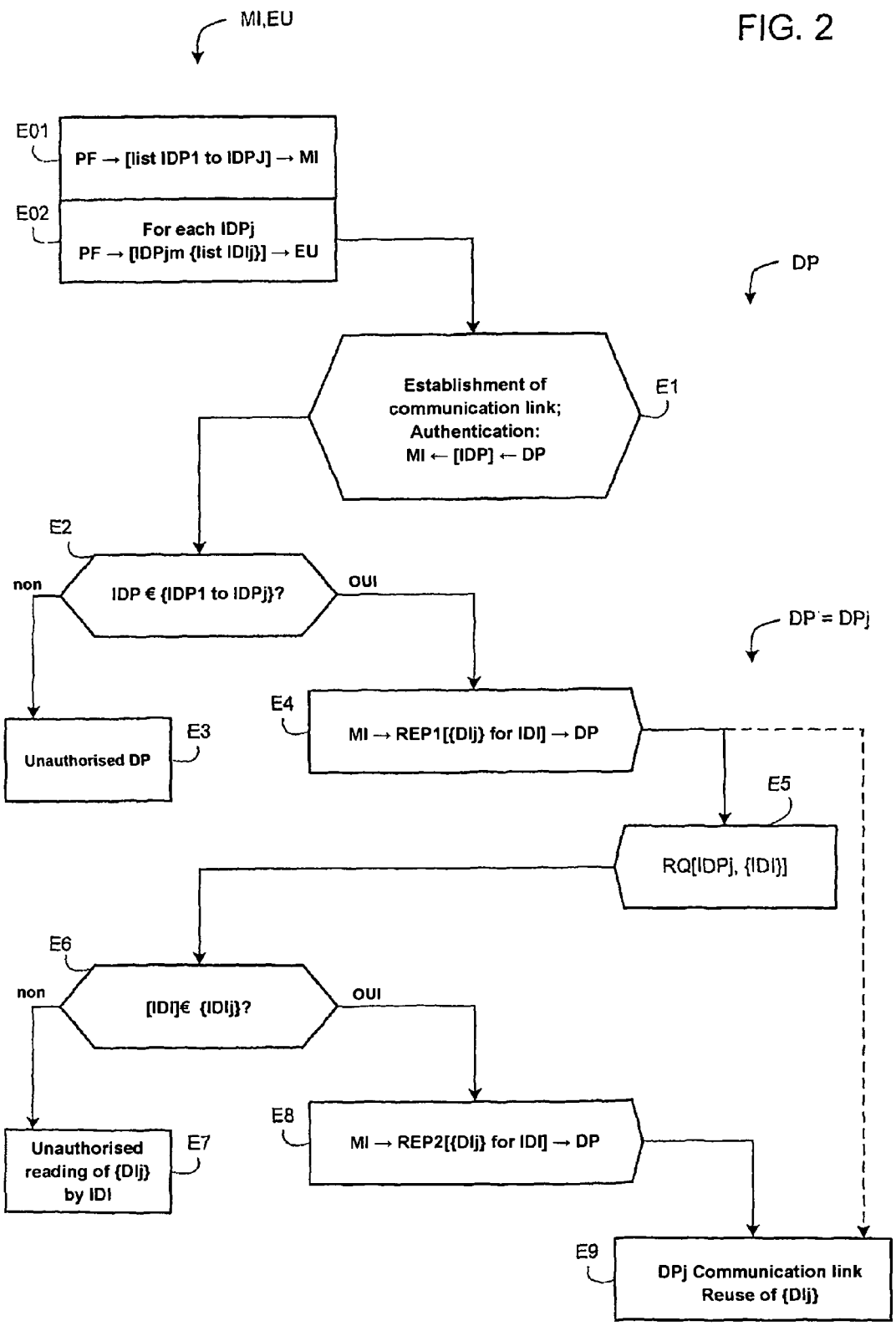
FIG. 2 shows an algorithm with the main steps in the method of reusing identity data.

Prior to any communication from any peripheral device DP, the identity module MI writes to EEPROM memory the identifiers IDP1 to IDPJ of the peripheral devices DP1 to DPJ which the user selects for connecting them to the equipment EU and authorizing them to reuse the respective identity data read from the identity module MI, and the sets of identifiers IDIj of several identity data DI of the identity module MI respectively associated with the identifiers IDP1 to IDPJ of the peripheral devices DP1 to DPJ in the identity module, as shown schematically in steps E01 and E02 in FIG. 2.

According to a first example, the identifier IDPj of a peripheral device DPj can be similar to a MAC (Medium Access Control) address including a peripheral device manufacturer identifier, a peripheral device type identifier and a peripheral device serial number. According to a second example, the identifier IDPj is the identifier which is included in a certificate of the peripheral device comprising, in addition, a private key and a public key and written to a secure module incorporated in the peripheral device DPj, of a TPM (Trusted Platform Module) type.

According to a simple embodiment of the invention, when the identifier IDPj of a peripheral device DPj belongs to the list of identifiers IDP1 to IDPJ previously stored in the identity module MI, the peripheral device DPj accesses a predetermined list of identity data from the identity module, for any given value of j of the peripheral device.

For example, the identity data which a peripheral device is capable of accessing are selected from among the International Mobile Subscriber Identity (IMSI) identifier, the Mobile Station ISDN Number (MSISDN) international mobile user number, an authentication key allowing the identity module to be authenticated by the radio-communication network RR, an encryption/decryption key for transmitting/receiving data during communication with the network RR, a password (PIN) entered by the user in order to access the functions of the user equipment EU, a session key, a signature key, etc.

However, according to the embodiment described below, each peripheral device DPj, the identifier IDPj of which was previously stored in the identity module MI in step E01, is only authorised to use a respective part DIj, or possibly all, of the identity data of the identity module MI. These respective identity data DIj are respectively associated with identifiers IDIj, or as an alternative, with identifiers IDIj of categories to which the respective identity data DIj belong. The association of the peripheral device identifier IDPj with the identity data identifiers IDIj is stored in the identity module MI in step E02.

In practice, previously, after the module identity MI user subscribes to the service for reusing identity data according to the invention, the operator of the home network RR records in the platform PF the association of a user identity module MI identifier, such as the international identifier IMSI provided by the HLR register, with the list of identifiers IDP1 to IDPJ supplied by the user during step E01 and also the association of each identifier IDPj with a list of identifiers IDIj of identity data DIj which can be read in the identity module MI in step E02, or assumed hereafter also to be a list of identity data category identifiers IDIj according to the alternative embodiment of the invention. On the operator's initiative, the list of authorised peripheral device identifiers IDP1 to IDPJ and the list of identity data identifiers IDIj for each peripheral device DPj are then transmitted by the platform PF via the network RR, the OTA1 radio interface and the user equipment EU to the identity module MI which stores them in steps E01 and E02. For example, the lists of identifiers are transmitted by the platform PF in response to a request to update the location of the mobile terminal, or following an authentication request, or even after switching on the mobile terminal during the process of associating it with its location area in the telecommunications network RR, signalled by a Home Location Register HLR.

The user can subsequently modify the contents of the list of peripheral device identifiers IDP1 to IDPJ in the identity module MI by modifying the status of the activation/deactivation bits respectively associated with the identifiers IDP1 to IDPJ. An activation/deactivation is selected by means of a graphical user interface, in particular comprising the keyboard and screen of the user equipment EU and it is signalled by a request to the platform PF via the OTA1 interface, the network RR and the short message centre CM. The platform PF therefore follows up, validates and performs any modifications relating to activation/deactivation decided by the user and possibly corrects them according to the user subscription profile which the platform PF can read from the home location register HLR. The activation/deactivation bit of the identifier IDPj of the peripheral device DPj is usually placed in the "1"/"0" state in the identity module MI by the user equipment EU after validation from the platform PF in order to keep/remove the identifier IDPj from among the identifiers IDP1 to IDPJ previously stored in the identity module MI and relating to the peripheral devices which are authorised to reuse certain identity data from the identity module MI.

The user of the identity module MI can also select certain identity data identifiers previously stored in the identity module in order to add or remove certain identity data identifiers from the list of identity data identifiers IDIj associated with each peripheral device DPj. Each addition or removal of an identity data identifier is validated by the platform PF. For example, an activation/deactivation bit is associated with each of the previously stored identity data identifiers IDIj. The activation/deactivation bit of the identity data identifier IDPj is set to "1"/"0" in the identity module MI by the user equipment EU after validation by the platform PF in order to keep/remove the identifier IDIj from among the identity data identifiers previously stored in the identity module and associated with the peripheral device DPj.

As shown in FIG. 2, the method of reusing identity data by any peripheral device DP identified by an identifier IDP comprises steps E1 to E9.

In step E1, a communication link is established between the peripheral device DP and the identity module MI in the user equipment EU.

For example, when the link LI between the peripheral device DP and the user equipment EU is a Bluetooth link, a PIN code is entered simultaneously into the user equipment EU and the peripheral device DP, both of which then establish a link key according to parameters such as random numbers exchanged between them, the pin code and their Bluetooth addresses. The identity module MI authenticates the peripheral device DP by comparing a response it has determined with a response it has received from the peripheral device based on the aforementioned parameters. After this authentication, the peripheral device DP can then proceed in a similar manner to authenticate the identity module MI. During the first authentication, the peripheral device DP transmits its identifier IDP to the identity module MI which stores it.

According to another alternative embodiment, the authentication of the peripheral device by the module MI, or the mutual authentication between the two is of a Transport Layer Security (TLS) type and can either replace the preceding authentication or complete it.

The identity module MI compares the transmitted identifier IDP of the peripheral device DP with the previously stored identifiers IDP1 to IDPJ of the peripheral devices DP1 to DPJ which have been previously authorised to reuse the respective identity data in the identity module MI, in step E2. If none of the peripheral device identifiers in the list {IDP1 to IDPJ} stored in the identity module MI are identical to the identifier IDP, the identity module MI breaks communication with the device DP in the user equipment EU and informs the user, for example by displaying an "Unauthorised peripheral device" message on the screen of the user equipment, in step E3. On the other hand, is the transmitted peripheral device DP identifier IDP is recognised as one IDPj of the previously stored identifiers, the module MI transmits a response REP1 showing that the transmitted identifier IDP=IDPj of the peripheral device DP=DPj belongs to the list {IDP1 to IDPJ}, in step 4.

According to the simple alternative in which all the authorised peripheral devices access a predetermined list of identity data of the identity module, for any value of j of the peripheral device, the peripheral device DPj is not capable of selectively requesting identity data in relation to identity data identifiers, and the response REP1 also contains the predetermined list of identity data of the identity module; the method then skips directly from step E4 to step E9, as indicated by the dotted line in FIG. 2.

According to the embodiment of the invention shown in FIG. 2, following the response REP1 which only contains the identifier IDPj, the peripheral device DPj establishes and transmits a request RQ including predetermined identity data identifiers IDI to the identity module MI, in step E5.

In step E6, the identity module MI compares the predetermined identity data identifiers IDI, transmitted in the request RQ by the peripheral device DPj, with the previously stored identity data identifiers associated with the identifier IDPj. If at least one of these identifiers IDI is not found in the list of identifiers IDIj, the identity module MI causes in step E7, in a similar way to step E3, a break in communication with the device DPj in the user equipment EU, and informs the user for example by displaying an message such as "Unauthorised reading of identity data" on the screen of the user equipment EU. On the other hand, if all the identity data identifiers IDI in the request RQ are found in the list of identity data identifiers {IDIj} previously stored in the identity module MI associated with the identifier IDPj of the peripheral device DPj, the identity module MI transmits a response REP2 to the peripheral device DPj. The response REP2 includes the identity data DIj respectively designated by the data IDI=IDIj recognised among the identity data identifiers associated with the identifier IDPj of the peripheral device DPj, in step E8.

In step E9, following the response REP1 with the predetermined list of identity data of the identity module transmitted in step E4 according to the simple alternative, or following the response REP2 transmitted in step E8 with the identity data DIj respectively designated by the recognised identity data IDIj, the peripheral advice DPj can perform the identification functions initially provided by the identity module MI by reusing at least part of the identity data DIj transmitted in the response REP1/2 in particular so that the home location register HLR in the network RR can authenticate the peripheral device DPj, which is to say the user of the module MI, in order to establish a communication link in particular with the internet RT, either with the network RR through the link LI, the user equipment EU and the OTA1 radio interface, or with the wireless local area network RL through the OTA2 radio interface.

The invention is not limited to the use of short range networks as its network RL. The second network RL can be any other communication network, for example a GSM or UMTS-type cellular radiotelephone network.

The invention claimed is:

1. A method of reusing identity data of a user equipment by a peripheral device, the user equipment being connected to a communication network, said method comprising the following steps:

storing, in said user equipment, a plurality of identity data items;

storing, in said user equipment, a plurality of peripheral device identifiers, each of said peripheral device identifiers corresponding to a respective peripheral device authorized by a user of said user equipment to receive and reuse at least one identity data item from the plurality of identity data items stored in said user equipment;

receiving from an identifier management platform, via the communication network, information that associates one or more peripheral device identifiers with one or more identity data item identifiers, each of said identity data item identifiers corresponding to a respective identity data item from the plurality of identity data items stored in said user equipment;

receiving by the user equipment, from a particular peripheral device, an identifier of said particular peripheral device;

comparing, by the user equipment, the peripheral device identifier received from the particular peripheral device with the plurality of peripheral device identifiers of said authorized peripheral devices stored in said user equipment;

based on said comparison, determining if said particular peripheral device is authorized to receive at least one identity data item from the plurality of identity data items stored in said user equipment;

if said particular peripheral device is authorized to receive at least one identity data item, selecting, by the user equipment, which identity data items from the plurality of identity data items stored in said user equipment are to be transmitted to said particular peripheral device, based on the association information received from said identifier management platform and the received identifier of the particular peripheral device; and transmitting the selected identity data items to the particular peripheral device.

2. The method according to claim 1, further comprising:
deactivating the peripheral device identifier in the user equipment based on a validation by the identifier management platform; and
removing said peripheral device identifier from the peripheral device identifiers in the user equipment.

3. The method according to claim 1, wherein the step of comparing includes:
after comparing peripheral device identifiers, transmitting a request including predetermined identity data item identifiers from the peripheral device to the user equipment following a response from the user equipment signalling that the transmitted peripheral device identifier is recognized,
comparing the predetermined identity data item identifiers in the request with the identity data items identifiers stored in the user equipment, and
when all the predetermined identity data item identifiers are recognised as being stored identity data item identifiers, transmitting the identity data item designated by the transmitted data item identifiers recognised among the identity data item identifiers associated with the peripheral device identifier, from the user equipment to the peripheral device.

4. The method according to claim 1, comprising adding or removing an identity data item identifier from the identity data item identifiers in the user equipment and associated with a peripheral device, after validation by the identifier management platform.

5. The method according to claim 1, wherein the identity data item is selected from among an international identifier, an international mobile user number, an authentication key, an encryption/decryption key, a password, a session key, and a signature key.

6. The method according to claim 1, wherein the identity data item transmitted to the peripheral device is reused by the peripheral device in order to initialise and use a communication link with the communication network.

7. The method according to claim 1, wherein the identity data item transmitted to the peripheral device is reused by the peripheral device in order to establish a communication link with another communication network.

8. The method according to claim 1, wherein the peripheral device identifiers include one of a peripheral device manufacturer identifier and a peripheral device serial number.

9. A computer-readable information storage device having program instructions recorded thereon that, when executed by a processor, control a user device to:
store, in the user device, a plurality of identity data items;
store, in the user device, a plurality of peripheral device identifiers, each of said peripheral device identifiers corresponding to a respective peripheral device authorized by a user of said user equipment to receive and reuse at least one identity data item from the plurality of identity data items stored in said user device;
receive, by the user device, from an identifier management platform, via a communication network, information that associates one or more peripheral device identifiers with one or more identity data item identifiers, each of said identity data item identifiers corresponding to a respective identity data item from the plurality of identity data items stored in said user device;
receive from a particular peripheral device, via a communication interface, an identifier of said particular peripheral device;
compare the peripheral device identifier received from the particular peripheral device with the plurality of peripheral device identifiers of said authorized peripheral devices stored in said user device;
based on said comparison, determine if said particular peripheral device is authorized to receive at least one identity data item from the plurality of identity data items stored in said user device;
select, if said particular peripheral device is authorized to receive at least one identity data item, which identity data items from the plurality of identity data items stored in said user equipment are to be transmitted to said particular peripheral device, based on the association information received from said identifier management platform and the received identifier of the particular peripheral device; and
transmit the selected identity data items to the particular peripheral device.

10. The computer-readable information storage device of claim 9, wherein the user device is controlled to:
deactivate the peripheral device identifier in the user device based on a validation by the identifier management platform, and
remove said peripheral device identifier from the peripheral device identifiers previously stored in the user device.

11. The computer-readable information storage device of claim 9, wherein said comparing the received peripheral device identifier includes:
after comparing peripheral device identifiers, transmitting a request including predetermined identity data item identifiers from the peripheral device to the user device following a response from the user device signalling that the transmitted peripheral device identifier is recognized,
comparing the predetermined identity data item identifiers in the request with the identity data item identifiers previously stored in the user device, and
when all the predetermined identity data item identifiers are recognised as being previously stored identity data item identifiers, transmitting the identity data item designated by the transmitted data identifiers recognised among the identity data item identifiers associated with the peripheral device identifier, from the user device to the peripheral device.

12. The computer-readable information storage device of claim 9, wherein the user device is controlled to transmit the identity data item identifiers respectively associated with peripheral device identifiers from the identifier management platform to the user device.

13. The computer-readable information storage device of claim 9, wherein the user device is controlled to add or remove an identity data items identifier from the identity data item identifiers stored previously in the user device and associated with a peripheral device, after validation by the platform.

14. The computer-readable information storage device of claim 9, wherein the identity data item is selected from among an international identifier, an international mobile user number, an authentication key, an encryption/decryption key, a password, a session key, and a signature key.

15. The computer-readable information storage device of claim 9, wherein the identity data item transmitted to the peripheral device is reused by the peripheral device in order to initialise and use a communication link with the communication network.

16. The computer-readable information storage device of claim 9, wherein the identity data transmitted to the peripheral device is reused by the peripheral device in order to establish a communication link with another communication network.

17. User equipment comprising:
an identity device storing (i) a plurality of identity data items and (ii) a plurality of peripheral device identifiers, each of said peripheral device identifiers corresponding to a respective peripheral device authorized by a user of said user equipment to receive and reuse at least one identity data item stored in said identity device,
a communication interface;
a processor, and
an information storage device having program instructions stored therein, said program instructions, when executed by the processor controlling the user equipment to:

receive via the communication interface, from an identifier management platform, information that associates one or more peripheral device identifiers of one or more peripheral devices with one or more identity data item identifiers, each of said identity data item identifiers corresponding to a respective identity data item from the plurality of identity data items stored in said identity device;

receive, via the communication interface, from a first one of said peripheral devices, a first peripheral device identifier of the first peripheral device, compare the first peripheral device identifier received from the first one of said peripheral devices with the plurality of peripheral device identifiers of said authorized peripheral devices stored in said identity device;

based on said comparison, determine if said first peripheral device identifier is authorized to receive at least one identity data item from the plurality of identity data items stored in said identity device;

select if said first peripheral device is authorized to receive at least one identity data item, which identity data items from the plurality of identity data items stored in said user equipment are to be transmitted to said first peripheral device, based on the association information received from said identifier management platform and the received identifier of the first peripheral device; and transmit the selected identity data items to said first peripheral device.

18. The method according to claim 17, wherein the identity data is selected from among an international identifier, an international mobile user number, an authentication key, an encryption/decryption key, a password, a session key, and a signature key.

19. The method according to claim 17, wherein the identity data transmitted to the peripheral device is reused by the peripheral device in order to initialise and use a communication link with a communication network.

* * * * *